June 6, 1933.   J. C. VAN BERKEL   1,912,390
SLICING MACHINE
Filed Oct. 26, 1928   4 Sheets-Sheet 1

Inventor:
Johannes C. van Berkel
By Nissen & Crane
Attys.

June 6, 1933.  J. C. VAN BERKEL  1,912,390
SLICING MACHINE
Filed Oct. 26, 1928  4 Sheets-Sheet 2
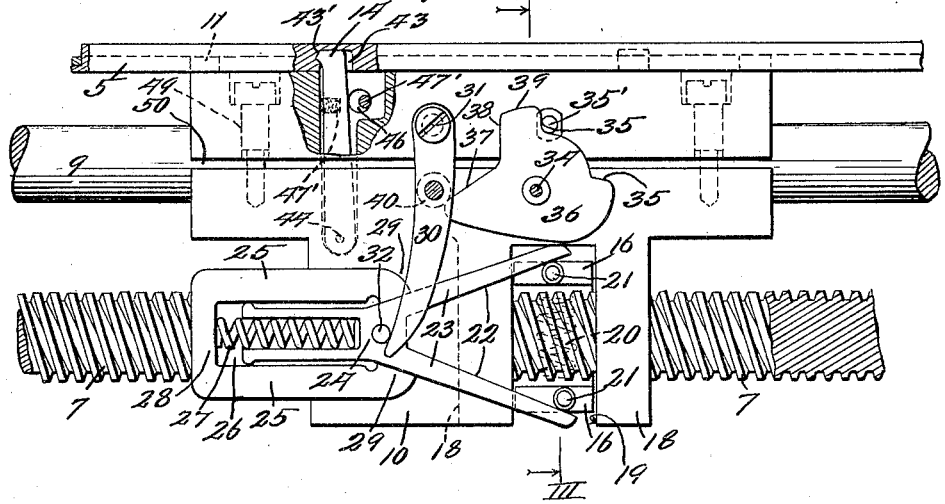
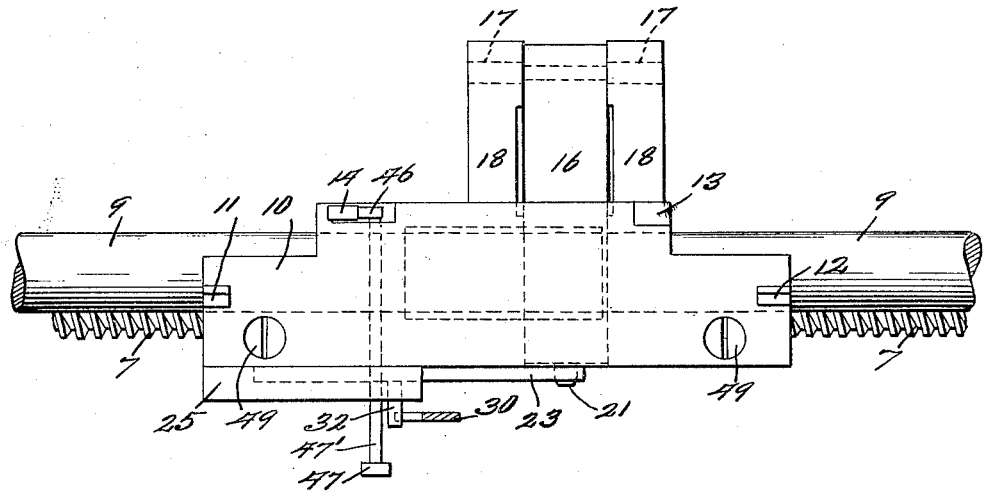
Inventor:
Johannes C. van Berkel
By Nissen & Crane
Attys June 6, 1933.   J. C. VAN BERKEL   1,912,390
SLICING MACHINE
Filed Oct. 26, 1928   4 Sheets-Sheet 3
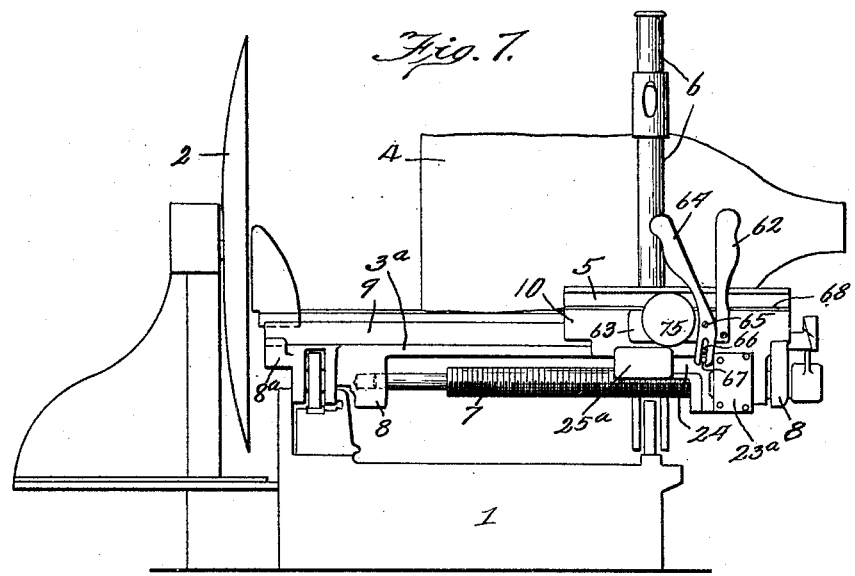

June 6, 1933. J. C. VAN BERKEL 1,912,390
SLICING MACHINE
Filed Oct. 26, 1928 4 Sheets-Sheet 4
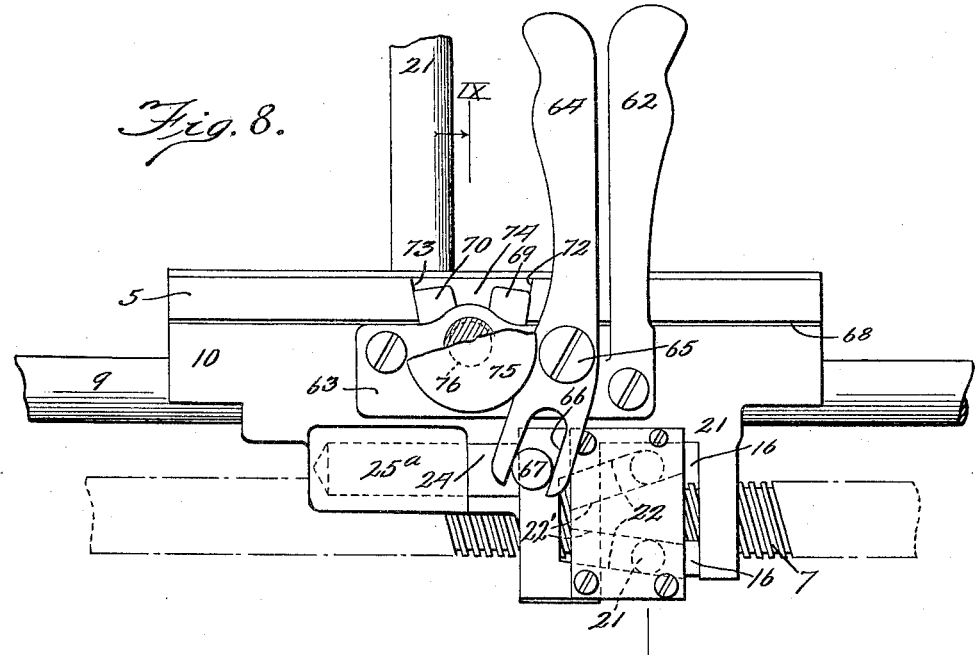
Fig. 8.
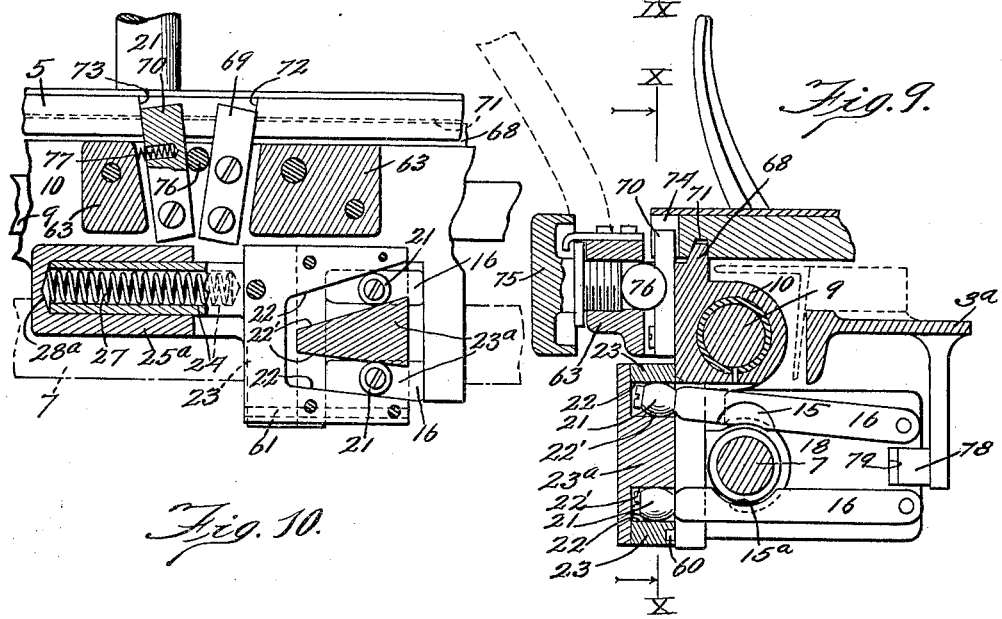
Fig. 9.
Fig. 10.
Inventor:
Johannes C. van Berkel
By Nissen & Crane
Attys Patented June 6, 1933

1,912,390

UNITED STATES PATENT OFFICE

JOHANNES C. VAN BERKEL, OF COPENHAGEN, DENMARK, ASSIGNOR TO NAAMLOOZE VENNOOTSCHAP MAATSCHAPPIJ TOT VERAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

SLICING MACHINE

Application filed October 26, 1928, Serial No. 315,332, and in Great Britain December 2, 1927.

This invention relates to slicing machines of the kind wherein the meat or other substance to be sliced is placed on a substance support which can be fed towards the slicing knife of the machine by feed mechanism including a rotatable feed screw and a feed device, usually a screw nut segment co-operating therewith, the feed device being directly or indirectly connected in some manner to the substance support. Usually, automatic means are provided for intermittently rotating the feed screw, and consequently advance the substance support, in the working of the machine, and the said means can be adjusted so as to regulate the extent of the intermittent advance movements of the support to suit the required thickness of the slices to be cut. It is desirable that the slices should all be of the exact thickness for which the automatic advancing means may have been adjusted. It is also desirable that the feed device should be capable of being withdrawn, at will, from engagement with the feed screw. To otain these desiderata, various constructions of feed mechanism have previously been proposed.

The means for connecting the bearing on the guide rod to the feed plate is also shown in my application, Serial No. 315,333, filed October 26, 1928, and is more fully covered in that application.

The object of this invention is to insure firm engagement between the feed device and the feed screw so as to prevent play and consequent variations in the thickness of the slices; and, to this end, in accordance with the invention, the feed device is adapted to be forced into engagement with the feed screw by inclined plane action, preferably derived from one or more inclined planes acted on by resilient means such as a spring. More than one feed device may be employed.

The feed device or feed devices may be supported by a block slidably arranged relatively to the feed screw, and the inclined plane action may be transmitted directly or indirectly to the feed device or feed devices by a member slidably mounted on the block and caused, by a spring or equivalent, to force the feed device or feed devices into firm engagement with the feed screw. The feed devices may be arranged on or combined with one or more levers fulcrumed on the block, the lever, or each lever, being fitted with a roller, or equivalent which rides along an inclined track on the aforesaid slidably mounted member.

In order that the invention may be clearly understood, different embodiments thereof, chosen by way of example, will now be described with reference to the accompanying drawings, in which—

Fig. 2 is a fragmentary view corresponding to Fig. 1 with certain parts removed, the view being drawn to a larger scale;

Fig. 4 is a plan of Fig. 2, with the feed table and parts of the mechanism removed for clearness;

Fig. 5 is a fragmentary view of a modification hereinafter referred to, and Fig. 6 is a section on the line VI—VI of Fig. 5;

Fig. 7 is a view similar to Fig. 1 of a slicing machine of the reciprocatory carriage type;

Fig. 8 is a fragmentary view, showing part of the machine shown in Fig. 7 in greater detail, the view being drawn to a larger scale;

Fig. 9 is a section approximately on the line IX—IX of Fig. 8; and

Fig. 10 is a section approximately on the line X—X of Fig. 9.

Throughout the several figures of the drawings the same numerals indicate the same or corresponding parts.

Figure 1:
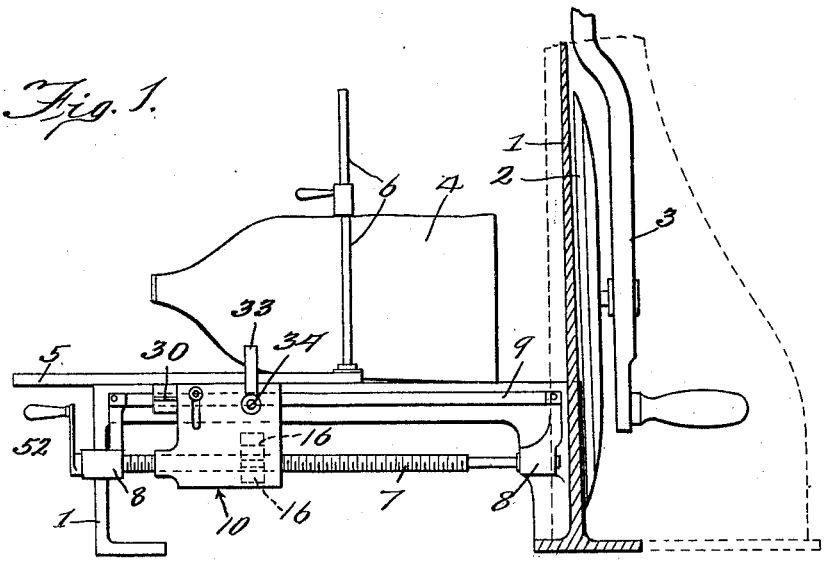
Fig. 1 is an elevation, partly in section, of a slicing machine of the swinging arm type only so much of the machine as is necessary for fully understanding the invention being shown.

The slicing machine shown in Fig. 1 is of the type in which a rotary disc knife is journaled at the free end of a swinging arm and is adapted to be carried thereby to-and-fro past the substance to be sliced.

Referring now to Figs. 1 to 4 of the drawings, the numeral 1 denotes the stationary frame of the machine, 2 the rotary disc knife, 3 the swinging arm, 4 the substance to be sliced, 5 the substance support, commonly called a "feed table", slidably mounted on the frame 1, 6 the clamp device for securing the substance to the feed table 5, and 7 the feed screw journaled in bearings 8 on the frame 1.

A guide preferably in the form of a bar 9 of circular cross-section is rigidly secured to the brackets 8 and extends above the feed screw 7 parallel thereto. A guide member or block 10 is slidably mounted on the bar 9. The block 10 is provided with upstanding projections 11, 12, 13 and 14 for positioning and securing the feed table to the block in a manner hereinafter described.

Figure 3:
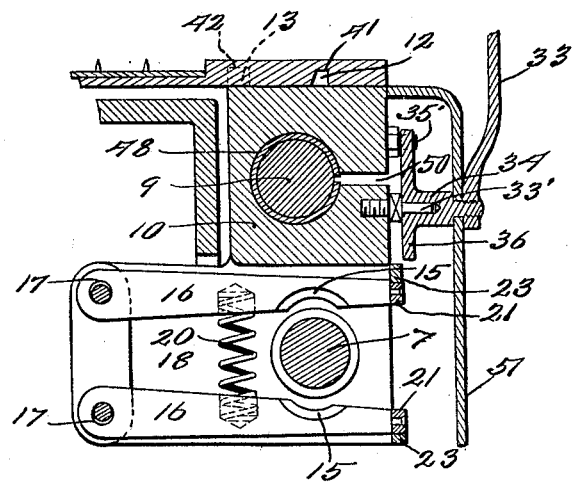
Fig. 3 is a section on the line III—III in Fig. 2.

The feed device of the machine is composite and may consist of one or two toothed elements or segments 15 movably mounted to engage the threads of the feed screw 7. As shown in Fig. 3, the toothed elements 15 are carried at the outer ends of two levers 16 disposed respectively above and below the feed screw 7. Each lever 16 has a self-adjusting eccentric connection 17 at its inner end with a pair of jaws 18 forming parts of the block 10. The levers 16 are located between the jaws 18 and pass beyond the feed screw through an opening 19 in the block. The levers 16 are fitted at their outer ends with projections or rollers 21, which latter ride along inclined tracks 22 (Fig. 2) presented by the inner surfaces of the branches 23 of a movable member constituted by the branches 23 and a stem 24 disposed in recumbent Y shape. The rollers 21 are urged against the tracks 22 by a spring 20 interposed between the levers 16. The stem 24 of the movable member 23, 24 is guided by the walls 25 of the recess 26 in the block 10. A spring 27, housed mainly within a slot in the stem 24, abuts against a wall 28 closing one end of the recess 26. The spring 27 urges the member 23, 24 in the direction away from the wall 28. The extent to which the member 23, 24 can move towards the wall 28, against the action of the spring 27, is limited by stops 29 on the walls 25. A contact element or lever 30 is provided for the purpose of moving the member 23, 24 toward the wall 28. The lever 30 is fulcrumed at 31 on the block 10 and contacts with a projection 32 on the member 23, 24. The lever 30 is adapted to be controlled in a manner hereinafter described by a hand lever 33 with a spindle 34.

The member 23, 24 is illustrated in Fig. 2 in the position it would occupy when moved against the stops 29. In this position the rollers 21 are located near the free ends of the branches 23, and, consequently, the toothed segments 15 are separated to the full extent and are clear of the feed screw 7. When, however, the lever 30 ceases to exert the force by which it overcomes the spring 27, the latter will move the member 23, 24 away from the stops 29, with the result that the rollers 21 will be forced towards one another by the inclined plane action of the tracks 22, and the toothed segments 15 thus caused to engage the feed screw.

The hand lever 33 is fulcrumed on a pin 33' on the block 10 and is movable between the limits defined by two shoulders 35 on a cam member 36 which latter is rigid with the spindle 34. The shoulders 35 co-act with a stationary projection 35' on the block 10. The cam member 36 is also formed with cam surfaces 37, 38 and 39 co-operating with a follower roller 40 on the lever 30. As shown, the surfaces 37, 38 constitute the sides of an obtuse, re-entrant angle, and the surface 38 merges into the surface 39 which is circular and approximately co-axial with the spindle 34. In the position of the parts shown in Fig. 2, the roller 40 is positioned near the outer end of the surface 37, and the action transmitted from the spring 27 through the lever 30, roller 40 and surface 37 to the hand lever 33 tends to force the latter into its mid-position, in which the roller 40 would be located at the junction of the surfaces 37 and 38. In order to maintain the parts in their Fig. 2 position, it would be necessary to hold the hand lever 33 against displacement. Immediately upon release of the hand lever 33, however, it would be moved into its mid-position by the spring 27. In the mid-position of the hand lever 33, the toothed segments 15 would engage the feed screw. By forcing the hand lever 33 towards its other extreme position the roller 40 would ride up the surface 38 onto the surface 39 and the toothed segments 15 would again move clear of the feed screws. The hand lever 33 may then be safely released without being returned to its mid-position by the action of the spring 27.

The upstanding projections 11, 12 on top of the block 10 are trapezial in cross-section and are adapted to fit into a conformably shaped groove 41 formed along the under side of the feed table 5. The projections 13, 14 are adapted to register, respectively, with recesses 42, 43 in the under side of the feed table. The projections 11, 12 and 13 are rigid with the block 10, whereas the projection 14 is pivotally mounted at 44 in a pocket in the block 10. The projection 14 constitutes, in effect, a latch and is shaped to engage with a notch 43' in the recess 43. The projection 14 is urged away from its position of engagement with the notch 43' by a spring 47'. When the projection 14 is forced into its position of engagement against the action of the spring 45, the feed table is tightened hard against the projection 13 and is thus effectively locked to the block 10.

The means for positioning and locking the feed table on the block forms no part of the present invention, but forms the subject of my concurrent application and it will be obvious that other means could be employed instead of that described and illustrated. For instance, the feed table might simply be secured by screws to the block.

The bar 9 passes through split bushings 48 which are clamped in position in the block 10 by screws 49 serving to draw tightly together parts of the block separated by a split 50 therein.

A rod 47' is journaled in the block 10 and has secured thereto a cam 46 which forces the lever or projection 14 into engagement with the notch 43' when the handle 47, Fig. 4, is turned. The block 10 is provided with a cover plate 51 through which the spindles of the hand levers 33 and 47 project.

In the embodiment shown, the feed screw is fitted with a handle 52 by which to turn it. If desired, automatic feed mechanism of any of the various well-known forms might be provided for this purpose.

The screw-threads of the feed screw are preferably trapezial in cross-section, the teeth of the segments 15 being conformably shaped. On account of the inclined plane action of the spring 27, inclined tracks 22 and parts co-operating therewith, the teeth of the segments 15 cannot be forced radially outwards from the feed screw when in working engagement therewith. Moreover, wearing of the working faces of the screw threads and the teeth will not affect the exactness of the forward feed movements of the feed table, as the toothed segments will simply be forced more deeply into engagement with the feed screw, by the aforesaid inclined plane action, should such wearing take place.

If it be desired that the toothed segments 15 should be positively constrained by the inclined tracks 22, the rollers 21 may be arranged to engage in grooves in the member 23, 24 and the spring 20 be dispensed with. Such an arrangement is shown in Figs. 5 and 6, in which the branches 23 are fitted with L-section strips 23' presenting inclined tracks 22'. The rollers 21 are guided in the grooves formed by the pairs of tracks 22, 22'. It will be obvious that slide blocks, instead of rollers might be employed.

An important advantage is obtained from this construction, as will now be explained. In order to impose a braking action on the feed table, a spring-urged guide, well known to those familiar with the art, is fitted in most slicing machines. This guide presses frictionally against the feed table and serves to retard the forward feed movements thereof. The ultimate object of the spring-urged guide is to maintain the co-acting faces of the screw thread of the feed screw and of the teeth of the feed device in continuous contact, so that the slices cut will all be of the exact thickness required. By making the screw threads of the feed screw trapezial, as above described, the spring-urged guide may be entirely dispensed with.

A further advantage of the construction above described is derived from the manner in which the toothed segments 15 are controlled. Owing to the fact that the member 23, 24 is horizontally slidable and also that the levers are vertically movable, the segments 15 automatically adjust themselves to suit any irregularities in the form of the feed screw, resulting from the latter being improperly finished during its manufacture.

Referring now to Figs. 7—10, the slicing machine to which the invention is therein shown applied is of the well-known reciprocatory carriage type, the numeral 1 again denoting the stationary frame and 2 the rotary knife. The character 3$^a$ denotes the reciprocatory carriage. The general operation of machines of this type is well known in the art and need not be herein described.

In this embodiment of the invention, the feed screw 7 is journaled in brackets 8 on the carriage 3$^a$. The guide bar 9 is rigidly secured to one of the brackets 8 and to a bracket 8$^a$ and extends above the feed screw parallel thereto. A split block 10 is slidably mounted on the bar 9 and has means (hereinafter described) for securing to it the feed table 5.

The feed device comprises a single toothed segment 15, a smooth guide member 15$^a$ being adapted to ride along the lower surface of the feed screw 7. The parts 15 and 15$^a$ are carried by levers 16, pivotally mounted between a pair of jaws 18 secured to the block 10. Rollers 21 are mounted on the free ends of the levers 16 and are engaged between inclined tracks 22 and 22' presented by two interconnected, slidable members 23, 23$^a$. A stem 24 extending from the member 23 enters a socket 25$^a$ in the block 10 and a spring 27 is interposed between the stem 24 and the base 28$^a$ of the socket. The member 23 is guided by the stem 24 within the socket 25$^a$ and also by a pin 60 entering a groove 61 in the member 23.

A handle 62 uprises from a bracket 63 on the block 10. A hand lever 64 is fulcrumed at 65 on the bracket 63, and is formed with a slot 66 entered by a pin 67 on the member 23.

It will be apparent that, by gripping the parts 62 and 64, and forcing the hand lever 64 from the position occupied by it in Fig. 7 towards the position in which it has been shown, and in which it is assumed to be held, in Fig. 8, the members 23, 23$^a$ will be moved against the action of the spring 27 until the stem 24 abuts against the base 28$^a$ of the socket. The parts 15, 15$^a$ will, at the same time, be forced clear of the feed screw (see Fig. 9), and, as a result, the feed table 5 may be moved freely across the carriage 3ª simply by pushing or pulling the handle 62. By releasing the hand lever 64, the members 23, 23ª will be returned, towards the right of the drawings, by the force of the spring 27, which force will be transmitted, considerably magnified, by the inclined plane action of the tracks 22 to the parts 15, 15ª. Consequently, the nut segment 15 will re-engage with the feed screw 7.

The feed screw 7 would be provided with means (not shown) for turning it both manually and automatically. Such means are well known in the art and form no part of the present invention.

The means for securing the feed table 5 to the block 10 comprise a rib 68, a stationary stop 69 and a pivotal latch 70, all projecting above the block. The rib 68 is trapezial in cross-section (see Fig. 9) and is engageable with a conformable groove 71 in the feed table. The stop 69 and the latch 70 are engageable with the inclined walls 72, 73 of a dove-tailed recess 74, the latch 70 being controlled by means of a hand member 75, screw-threaded through the bracket 63 and co-operating with a ball 76 centered between the stop 69 and the latch 70. When the feed table is correctly located on the block 10, with the rib 68 engaging in the groove 71 and the stop and latch entered in the recess 74, it can be locked simply by screwing the hand member 75 further into the bracket 63 and thereby forcing the ball 76 further between the stop and latch, which will be pressed hard against the walls 72, 73. By unscrewing the hand member 75, the latch 70 will move towards the stop 69 by the action of a spring 77, after which the feed table 5 may be freely lifted from the machine.

The jaws 18 are slidably supported by a rib 78 which engages with recesses 79 in the jaws.

The embodiment described with reference to Figs. 7 to 10 possesses the same advantages as the first embodiment. It will be apparent that both embodiments are equally applicable to slicing machines of either the swinging arm or reciprocatory carriage types, as well as to slicing machines of other types.

It is to be noted that, in the first embodiment, the feed screw and guide bar are disposed at the "far side" of the machine (i. e. the side opposite to that at which the operator is obliged to stand when operating the machine). In the second embodiment, the feed screw and guide bar are disposd at the near side of the machine. This latter arrangement has certain advantages over the former, as by it the operator is enabled to fit the feed table on the machine, or remove it therefrom, with greater facility, but in both of these types of machine the feed screw may be disposed at the near side or the far side, as may be desired.

In all of the embodiments of the invention shown, there is a means acting to disengage the feed nut from the screw when the member 23, 24 in the first embodiment and the member formed by parts 23, 23a and 24 in the second embodiment is moved against the action of the spring 27. In the embodiment shown in Figs. 1 to 4, the spring 20 acts to move the feed nut constituted by the element or elements 15 out of engagement with the screw when the member 23, 24 is moved to the left, as viewed in Fig. 2. In the embodiment shown in Figs. 5 and 6 and in Figs. 7 to 10, the means acting to disengage the feed nut or element 15 from the feed screw is the inclined face 22' engaging the projection 21 at the side opposite the inclined face 22' and acting to move the feed nut or element 15 away from the feed screw.

It is to be understood that the embodiments hereinbefore described have been chosen simply as illustrative examples and that other modifications may be made without departing from the scope of the invention.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. Feeding mechanism for the feed table of slicing machines comprising in combination, a feed screw, an element movably mounted on said table for engaging the threads on said screw, a member having a surface inclined to the axis of said screw co-operating with said element, means for imparting rectilinear movement to said member in opposite directions, said element being forced into engagement with said screw by said inclined surface when said member is moved in one direction, and means acting to disengage said element from said screw when said member is moved in the opposite direction.

2. Feeding mechanism for the feed table of slicing machines comprising in combination, a feed screw, an element movably mounted on said table for engaging the threads on said screw, a member having a groove with inclined side walls, means on said element projecting into said groove, and means for moving said member in different directions to force said element into and out of engagement with said screw by the inclined plane action of said walls.

3. Feeding mechanism for the feed table of slicing machines comprising in combination, a feed screw, an element movably mounted on said table for engaging the threads on said screw, a member having a groove with inclined side walls, means on said element projecting into said groove, a spring for moving said member in one direction to force said element into engagement with said screw by the inclined plane action of said walls, and means for moving said member against the action of said spring to disengage said element from said screw by said inclined groove.

4. Feeding mechanism for the feed table of slicing machines comprising in combination, a feed screw, a pair of pivoted levers carried by said table disposed on opposite sides of said screw, one of said levers carrying an element for engaging the threads of said screw, and a movable member having a pair of inclined surfaces slidably engaging said levers to swing said levers about their pivots toward said screw to engage said element with the threads of said screw when said member is moved in one direction, and other inclined surfaces on said member acting upon said levers to move them away from said screw for disengaging said element from the threads of said screw when said member is moved in the opposite direction.

5. Feeding mechanism for the feed table of slicing machines comprising in combination, a feed screw, a pair of pivoted levers carried by said table disposed on opposite sides of said screw, one of said levers carrying an element for engaging the threads of said screw, and a movable member having a pair of inclined surfaces slidably engaging said levers, a spring acting upon said movable member to swing said levers about their pivots into contact with said screw to engage said element with the threads of said screw, means for moving said member against the action of said spring, and means acting upon said levers to swing them about their pivots out of contact with said screw and disengage said element from the threads of said screw when said member is moved by said last-mentioned means against the action of said spring.

6. Feeding mechanism for the feed table of slicing machines comprising in combination, a feed screw, a pair of pivoted levers carried by said table disposed on opposite sides of said screw, one of said levers carrying an element for engaging the threads of said screw, and a movable member having a pair of diverging inclined grooves, one of said levers carrying an element for engaging the threads of said screw, means on said levers projecting into said grooves, and means for moving said member in different directions to swing said levers about their pivots and force said elements into and out of engagement with said screw.

7. Feeding mechanism for the feed table of slicing machines comprising in combination, a feed screw, a pair of pivoted levers carried by said table disposed on opposite sides of said screw, one of said levers carrying an element for engaging the threads of said screw, and a movable member having a pair of diverging inclined grooves, one of said levers carrying an element for engaging the threads of said screw, means on said levers projecting into said grooves, a spring acting upon said member for moving it in one direction to swing said levers about their pivots toward said screw to engage said element with the threads of said screw, and means for moving said member against said spring to disengage said element from the threads of said screw.

8. Feeding mechanism for the feed table of slicing machines comprising in combination, a feed screw, an element movably mounted on said table for engaging the threads on said screw, a member having a surface inclined to the axis of said screw co-operating with said element, a spring for moving said member to force said element into engagement with said screw by the inclined plane action of inclined surface, and means for moving said member against the action of said spring to release said element from the action of said inclined surface, said means comprising a cam having a plurality of cam faces thereon, a contact element co-operating with said member and cam, one of said faces being formed to engage said contact element and hold said member retracted against the action of said spring, said contact element being constrained to move under the action of said spring along one of said faces to a point at the junction of said last-named face with another of said faces to permit engagement of said element with said screw.

9. In a slicing machine having a feed table and a slicing knife, a feeding mechanism for said machine comprising in combination, a guide and a feed screw disposed in substantially parallel relation, a guide block attached to said table slidable on said guide towards the cutting plane of said knife, a movable element carried by said table for engaging the threads of said screw, a member slidably carried by said table having an inclined surface engaging said element, a spring forcing said member in one direction to force said element into engagement with the threads of said screw, a handle for moving said member against the action of said spring, and means acting upon said element to move said element out of contact with said screw when said member is moved against the action of said spring.

10. In a slicing machine having a feed table and a slicing knife, a feeding mechanism for said machine comprising in combination, a guide bar and a feed screw disposed in substantially parallel relation, a guide block attached to said table slidable on said bar towards the cutting plane of said knife, an element movably mounted on said block for engaging the threads of said screw, a member slidably mounted on said block having an inclined surface engaging said element, a spring forcing said member in one direction to force said element into engagement with the threads of said screw, a handle for moving said member against the action of said spring, and means acting upon said element to move said element out of contact with said screw when said member is moved against the action of said spring.

11. A feeding mechanism for slicing machines comprising a feed screw adapted to be supported by one of two relatively movable elements of said slicing machine, a pivoted feed nut adapted to be supported by the other of said elements, a self-aligning bearing for the pivot of said feed nut, and means for moving said feed nut into and out of engagement with said feed screw.

12. A feeding mechanism for slicing machines comprising a feed screw adapted to be supported by one of two relatively movable elements of said slicing machine, a pivoted feed nut adapted to be supported by the other of said elements, an eccentric freely rotatable bearing supporting said feed nut for pivotal movement, whereby said feed nut is self-aligning when brought into engagement with said feed screw, and means for moving said feed nut into engagement with said feed screw.

13. Feeding mechanism for the feed table of slicing machines comprising in combination a feed screw, an element movably mounted on said table for engaging the threads on said screw, a member having a surface inclined to the axis of said screw co-operating with said element, a spring for moving said member to force said element into engagement with said screw by the inclined plane action of said inclined surface, a handle, and means associated with said handle and actuated thereby, said last mentioned means being adapted to automatically lock said element in disengaged position when moved in one direction and permitting re-engagement of said element with said screw when moved in the opposite direction, and means for causing re-engagement of said element with said screw when said means actuated by said handle is moved in said last mentioned direction.

14. Feeding mechanism for slicing machines comprising an under table, a feed table slidable relatively thereto, a feed screw mounted on said under table, a feed nut movably mounted on said feed table, means for normally urging said feed nut away from said feed screw for actuating said feed nut to bring said feed nut into engagement with said feed screw, and releasable manually operated means for positively holding said feed nut out of operative position with said feed screw, said manually operated means being adapted to hold said feed nut out of operative position when released.

15. Feeding mechanism for slicing machines comprising an under table, a meat table slidable on said under table, a feed screw mounted on one of said tables, a feed nut movably mounted on the other of said tables, means for normally urging said feed nut away from said feed screw, means movable in one direction for temporarily holding said nut out of engagement with said feed screw but preventing the locking of said nut in said position so that upon release of said movable means said feed nut may be moved toward said feed screw, said last mentioned means being also movable in another direction to lock said nut positively out of engagement with said feed screw, and means for urging said feed nut into operative engagement with said feed screw.

16. A device as claimed in claim 15 in which said movable means comprises a cam having a plurality of cam surfaces one of which causes movement of said feed nut out of engagement with said feed screw when said cam is moved in one direction but which will not permit said cam to remain at rest in that position, and another of which is shaped so as to move said feed nut out of engagement with said feed screw and also lock said feed nut in that position.

In testimony whereof I have signed my name to this specification on this 17th day of September A.D. 1928.

JOHANNES C. van BERKEL.